United States Patent
Balson

[11] 3,812,585
[45] May 28, 1974

[54] DENTAL MATRIX BAND AND CLAMP ASSEMBLY

[76] Inventor: John E. Balson, Devon Professional Bldg., Devon, Pa. 19333

[22] Filed: Feb. 18, 1972

[21] Appl. No.: 227,405

Related U.S. Application Data

[63] Continuation-in-part of Ser. No. 123,235, March 11, 1971, abandoned.

[52] U.S. Cl. ................................................ 32/63
[51] Int. Cl. ............................................ A61c 5/12
[58] Field of Search ........................................ 32/63

[56] References Cited
UNITED STATES PATENTS

| 1,958,667 | 5/1934 | Howe ........................................ 32/63 |
| 3,436,831 | 4/1969 | Tofflemire ................................. 32/63 |
| 3,491,447 | 1/1970 | Newman .................................. 32/63 |
| 3,517,444 | 6/1970 | Tofflemire ................................. 32/63 |

Primary Examiner—Robert Peshock
Assistant Examiner—J. Q. Lever
Attorney, Agent, or Firm—John W. Logan, Jr.

[57] ABSTRACT

Disposable clamp is provided for use with a matrix band during the tooth-filling operation. The clamp has a narrow slot extending through it which slidably receives both ends of the matrix band with the ends of the band positioned in side-by-side relation. Catch means is mounted in the clamp adjacent the slot on the side of the clamp facing away from the tooth to permit the band to be displaced relative to the clamp in one direction but to prevent the band from slipping through the catch in the opposite direction for the purpose of maintaining the band snugly engaged around the tooth. Catch release means is provided to permit disengagement of the band from the catch so that the catch and clamp may be loosened or released from the band and the band thereafter removed from the tooth. In one form of the disclosure the catch release means comprises a member which normally urges the catch means into engagement with the band while in another form of the disclosure the catch release means comprises a removable member which normally urges the ends of the bands away from one another into engagement with the catch means.

9 Claims, 15 Drawing Figures

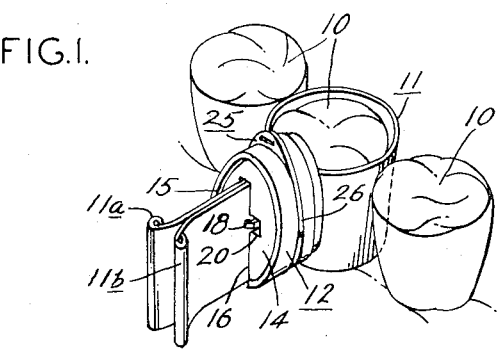
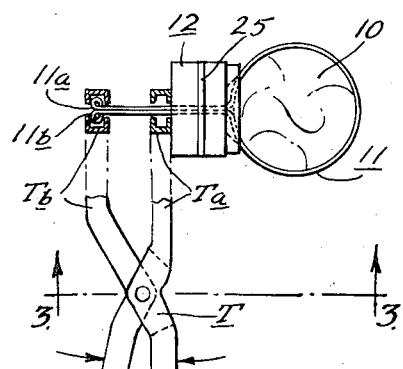
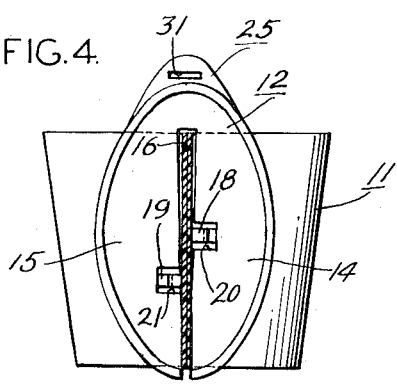
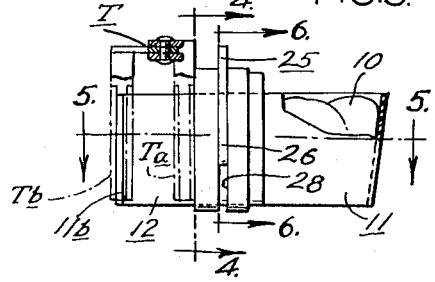
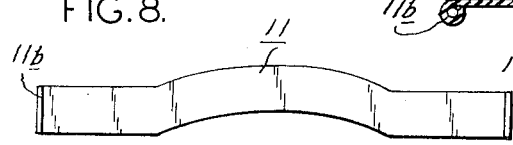
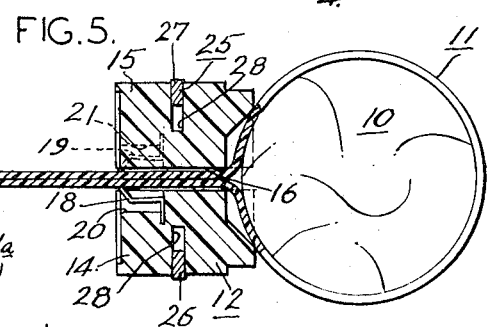
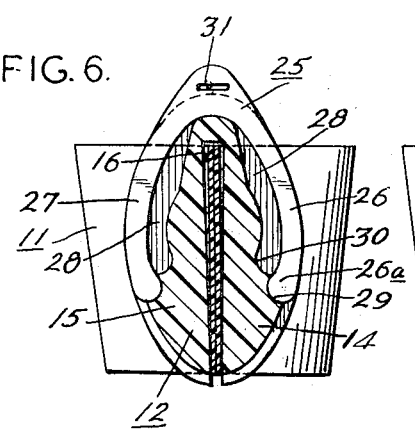
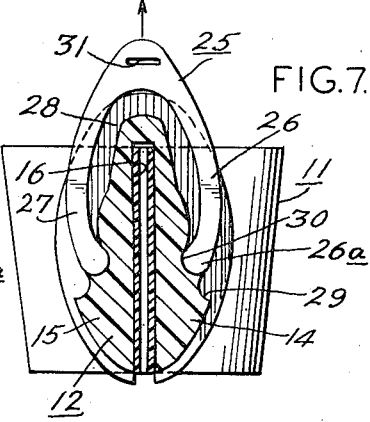

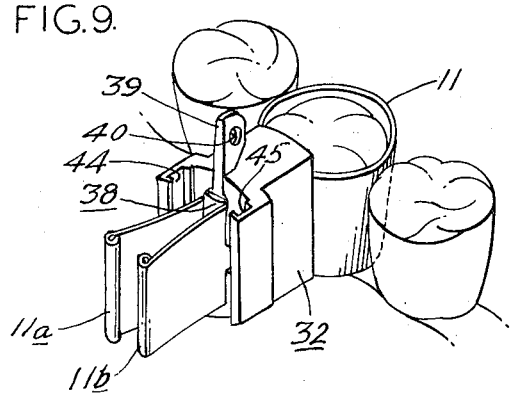
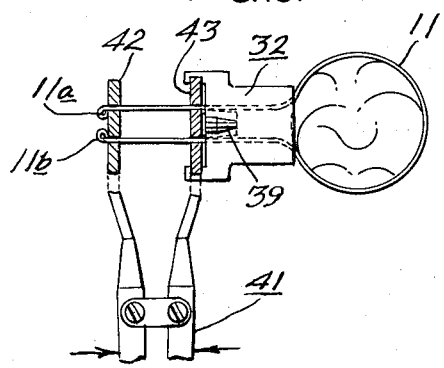
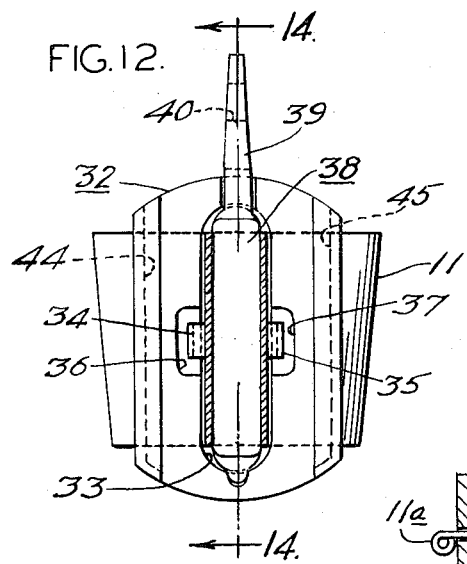
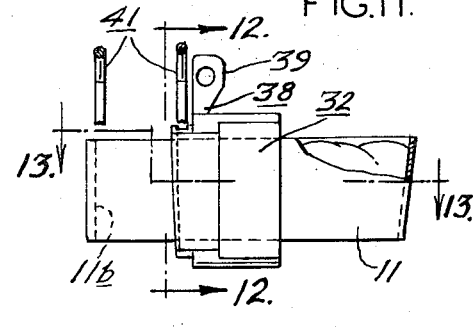
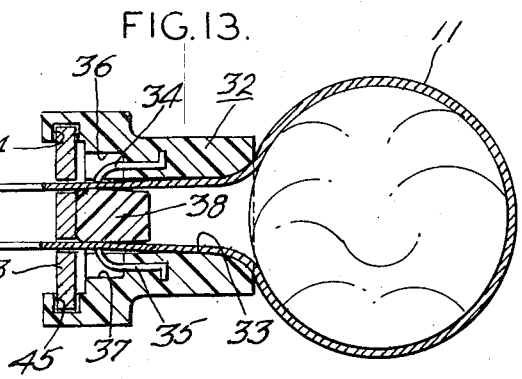
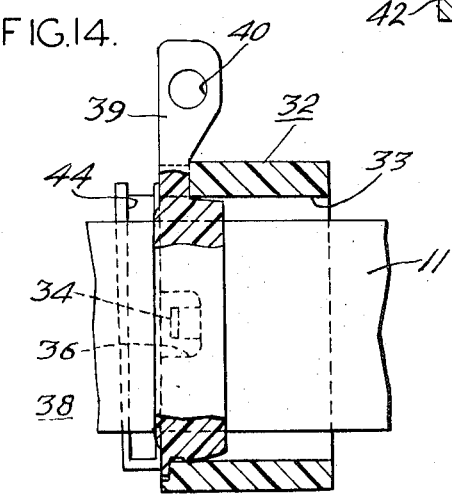
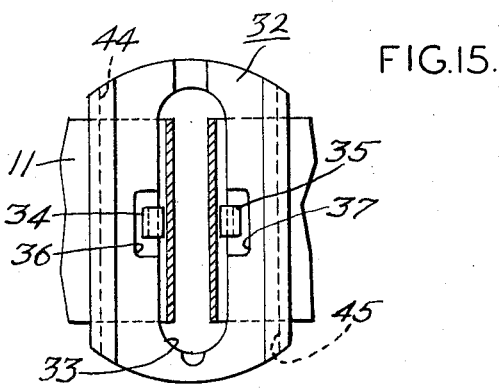

DENTAL MATRIX BAND AND CLAMP ASSEMBLY

This application is a continuation-in-part of my co-pending application Ser. No. 123,235, filed Mar. 11, 1971 now abandoned.

The present invention relates to dental matrix band and clamp assemblies.

Various forms of matrix bands and clamp devices have been proposed for use in tooth-filling operations. Examples of such devices are disclosed in U.S. Pat. Nos. 3,091,729 and 2,575,800, and although these devices may operate satisfactorily, neither is as easy to mount and dismount from teeth as would be desired. Other devices have also been proposed; and they are disclosed in the following U.S. Pat. Nos. 2,602,227; 3,028,673; 3,262,208; 3,140,544; 3,383,769; 3,411,214; 2,622,325 and 1,072,015.

With the foregoing in mind, it is a primary object of the present invention to provide an improved dental matrix band and clamp assembly.

It is another object of the present invention to provide a novel clamp for use with a conventional matrix band.

As a further object, the present invention provides a unique dental matrix band and clamp assembly which is relatively easy to mount on and dismount from a tooth.

It is still a further object of the present invention to provide a disposable dental matrix band and clamp assembly which is capable of being supplied to dentists as a unit ready for mounting onto a tooth.

More specifically, the present invention provides a clamp for use with a matrix band adapted to surround a tooth. In one form of the invention, the clamp has a bifurcation forming depending legs with a narrow downwardly open slot therebetween for slidably receiving a looped matrix band. Catch means is mounted to the legs adjacent the slot and is disposed at an acute angle with respect to the band and on the side of the clamp away from the tooth to permit the band to be displaced in one direction away from the tooth but to prevent the band from slipping in the opposite direction after the band is pulled tightly about the tooth. Catch release means in the form of an inverted U-shaped spring element straddles the legs and engages in detent means in the legs to bias the legs toward one another and the catch means against the band. The spring element is mounted for displacement edgewise of the band and when so displaced, the spring element disengages the detent means and permits the legs to separate. This permits the clamp to be removed from the band and the band to be dismounted from the tooth.

In another form of the invention the clamp has a slot extending entirely through its midportion for receiving the legs of a looped matrix band. The catch means are mounted adjacent opposite sides of the slot and a removable wedge is provided adapted to fit between the ends of the looped matrix band and force the matrix band into engagement with the catch means. When assembled in this manner the matrix band may be pulled tightly about the tooth and remain in this condition about the tooth until removal of the wedge. When the wedge is removed the legs of the matrix band are disengaged from the catch means thereby permitting removal of the clamp from the matrix band and removal of the matrix band from the tooth.

These and other objects, features and advantages of the present invention should become apparent from the following description when taken in conjunction with the accompanying drawing in which:

FIG. 1 is a perspective view of a tooth on which is mounted a matrix band and clamp assembly embodying the present invention;

FIG. 2 is a plan view illustrating the assembly of FIG. 1 in the process of being mounted onto the tooth by means of a tool;

FIG. 3 is a sectional view taken along line 3—3 of FIG. 2;

FIGS. 4 and 5 are enlarged sectional views taken along lines 4—4 and 5—5, respectively, of FIG. 3;

FIG. 6 is an enlarged sectional view taken along line 6—6 of FIG. 3 to illustrate the clamp engaged against the band for maintaining the band mounted to the tooth;

FIG. 7 is a view similar to FIG. 6 but illustrating the clamp disengaged from the band prior to removal of the band from the tooth;

FIG. 8 is a plan view of a form of matrix band which may be employed with the clamp of the present invention;

FIG. 9 is a perspective view similar to FIG. 1, illustrating a modified form of matrix band and clamp assembly of the present invention;

FIG. 10 is a plan view illustrating the assembly of FIG. 9 in the process of being mounted on to a tooth;

FIG. 11 is a side elevational view partially in section of the assembly of FIG. 10;

FIGS. 12 and 13 are enlarged sectional views taken along lines 12—12 and 13—13, respectively, of FIG. 11;

FIG. 14 is a transverse sectional view taken along line 14—14, FIG. 12; and

FIG. 15 is a view similar to FIG. 12, with the matrix band wedge member removed and the ends of the matrix band out of engagement with the catch means.

Referring now to the drawings, there is illustrated in FIG. 1 a series of human teeth 10, 10 one of which mounts a matrix band 11 and a band clamp 12 embodying the present invention. As may be seen in FIG. 8, the band 11 is bowed edgewise intermediate its ends so as to enable it to snugly engage around upwardly diverging tooth walls such as illustrated in FIG. 3. The ends 11a and 11b (FIG. 1) of the band 11 are reversely bent upon themselves and are engaged by a spreader tool T (FIG. 2) for snugging the band 11 around the tooth during mounting.

The band 11 is maintained engaged around the tooth 10 by means of the clamp 12 which enables the band 11 to be readily mounted on and dismounted from the tooth 10. To this end, the clamp 12 (FIG. 4) is of molded plastic construction and has a narrow slot 16 formed between depending legs 14 and 15. In the illustrated embodiment, the width of the slot 16 is slightly greater than the thickness of the doubled band; and, the depth of the slot 16 is slightly greater than the width of the band. Thus, the band 11 may be adjusted longitudinally and transversely in the slot 16 while it is being snugged around the tooth 10.

According to the present invention, catch means is provided on the legs 14 and 15 of the clamp 12 to permit the clamp 12 to be displaced toward the tooth 10 during mounting but to prevent the clamp 12 from slipping in the opposite direction after mounting, thereby to maintain the band 11 snugly engaged around the tooth during the tooth-filling operation. In the illustrated embodiment, the catch means comprises a pair of rigid Z-shaped flat metal elements 18 and 19 molded into recesses 20 and 21 of the legs 14 and 15, respectively, of the clamp 12. As may be seen in FIG. 5, each element, for instance the element 18, has a horizontally extending portion which is angulated in a vertical plane with respect to the band 11. The elements 18 and 19 are located in the side of the clamp 12 which faces away from the tooth 10 and the elements converge toward one another to engage the band 11 therebetween for preventing it from slipping toward the tooth once the band 11 has been snugged therearound. Preferably, the elements 18 and 19 are offset vertically with respect to one another as illustrated in FIG. 4 to engage opposite sides of the band 11 at vertically spaced locations. With this structure, the clamp 12 operates to maintain the band snugly engaged around the tooth 10 without slipping throughout the entire tooth-filling operation.

For the purpose of disengaging the clamp 12 from the band 11 to enable the band 11 to be dismounted from the tooth 10, means is provided to release the catch means from engagement with the band 11. To this end, the catch release means includes an inverted U-shaped spring element 25 which has depending prong portions 26 and 27 engaging the outsides of the legs 14 and 15, respectively. The spring element 25 is mounted for vertical displacement between its limit positions illustrated in FIGS. 6 and 7 by means of a peripheral recess 28 which extends around the legs 14 and 15. In the illustrated embodiment, each portion of the spring element 25, for instance the right hand prong 26 (FIG. 6) has a convex terminus 26a which matingly engages in an outwardly concave detent 29 in the recess 28 when the spring element is in its downwardmost limit position (FIG. 6) and which matingly engages in a similarly shaped detent 30 located inwardly and upwardly of the detent 29 in the recess 28 (FIG. 7). The spring element 25 is of spring metal and is shaped to apply an inward force on the legs 14 and 15 to cause the catch elements 18 and 19 to engage the band when the spring element 25 is in its downward limit position. The spring element 25 operates to relieve the inward force on the legs 14 and 15 to permit the catch elements 18 and 19 to disengage from the band 11 when the spring element 25 is in its upward limit position. A small aperture 31 is provided in the spring element 25 for engagement by a dental instrument to displace the spring element 25 upwardly. Thus, when the spring element 25 is in its upward limit position, the clamp 12 may be displaced upwardly and edgewise of the band 11, and the band 11 may be dismounted from the tooth 10 in the usual manner.

In order to tension the band 11 and to urge the clamp 12 snugly against the tooth 10 during mounting of the assembly, the tool T is provided. As illustrated in FIGS. 2 and 3, the tool T has pivotally connected jaw members Ta and Tb each with bifurcated end portions straddling the top edge of the band 11. One end portion of the jaw member engages against the side of the clamp 12 which faces away from the tooth; and the other end portion of the jaw member engages the reversely bent ends 11a and 11b of the band 11. Thus, when the handles of the jaw members are urged toward one another (in the direction of the arrows in FIG. 2) the jaw members separate from one another to displace the band ends 11a and 11b leftward and the clamp 12 rightward against the tooth 10, with continued separation of the jaw members Ta and Tb causing tightening of the band 11 about the tooth. Upon disengagement of the jaw members from the band 11, the catch elements 18 and 19 cooperate to prevent backward slipping of the band 11. Thus, the band 11 is snugly engaged around the tooth until removed as described above.

In the embodiment of FIGS. 9 to 15, inclusive, a band clamp 32 is provided having an elongated aperture or slot 33 extending axially through the clamp. The ends of a looped matrix band 11 are adapted to extend through the slot and project outwardly beyond the rear face of the clamp. As best shown in FIGS. 14 and 15, the slot 33 has a height greater than the width of the matrix band and a width substantially greater than the combined thickness of the two ends of the matrix band.

The catch means for the clamp for this embodiment of the present invention consists of a pair of rigid, generally Z-shaped, flat, metal elements 34 and 35 molded into recesses 36 and 37, respectively, in the clamp body at opposite sides of the slot 33 with the free ends of the elements 34 and 35 projecting angularly inward toward the axis of the clamp body and extending in a direction toward the rear face of a clamp body, for example, as shown in FIG. 13.

In order to releasably maintain the ends of the looped matrix band 11 in engagement with the elements 34 and 35 a removable wedge 38 is provided. The wedge 38 includes a body portion adapted to be inserted into the slot 33 in the clamp body and when in position in the slot 33 in the clamp body urge the opposite ends of the looped matrix band outwardly into engagement with the catch elements 34 and 35. An upwardly projecting finger portion 39 is provided on the body of the wedge 38 which has an aperture 40 therein to permit the removable wedge 38 to be engaged by a dental tool and removed from the clamp body.

Preferably the free ends of the catch elements 34 and 35 project inwardly into the slot 33 so that when the ends of a looped matrix band 11 are contained within the slot and the wedge body is positioned in the slot as shown in FIGS. 12 and 13, the outer surface of the legs of the matrix band are in engagement with the free ends of the catch elements 34 and 35. In this condition, with the wedge held in position in the slot 33 the free ends of the looped matrix band may be pulled through the slot in a direction to tighten a loop of the matrix band about a tooth but are prevented from movement in the opposite direction through the clamp body by the action of the wedge forcing the outer side surfaces of the free ends of the matrix band into engagement with the inclined free ends of the catch elements 34 and 35.

However, when the wedge is removed from the slot in the clamp body the free ends of the looped matrix band will be disengaged from the catch elements 34 and 35 permitting easy removal of the clamp body from the matrix band.

In order to permit easy application of the matrix band about a tooth and tightening of the matrix band loop around the tooth while at the same time preventing displacement of the wedge 38 from the slot 33, a dental instrument 41, such as shown partially in section in FIG. 10 having opposed jaw members 42 and 43, is provided. Each jaw member 42 and 43 has a pair of spaced parallel slots formed therein adapted to engage over the spaced-apart free ends of the looped matrix band 11, for example, as shown in FIGS. 10 and 13. Additionally, a pair of inwardly-facing recesses 44 and 45 are provided at the rear face of the clamp body 32 within which one jaw member 43 of the dental instrument 41 is adapted to fit. With the dental instrument in this position one jaw member 43 is engaged with the clamp body 32 and bears against the rear surface of the wedge 38 thus holding the wedge 38 in the desired position within the clamp body slot 33. The other jaw member 42 is spaced from the jaw member 43 and is in engagement with the reversely bent or enlarged ends 11a and 11b of the matrix band. Squeezing the handle of the dental instrument 41 to pull the jaw members 42 and 43 away from one another will tighten the matrix band 11 about the tooth.

Thereafter, the dental instrument 41 may be removed and a dentist may perform the necessary operations on the tooth while a matrix band is tightly engaged about the tooth. When it is desired to remove the matrix band from the tooth, the dentist will first remove the wedge from the clamp body and thereafter remove the clamp body from the ends of the matrix band. The matrix band is then free to be removed from the tooth.

In view of the foregoing, it should be apparent that an improved dental matrix band and clamp assembly has been provided. The assembly is disposable and is of compact construction, thereby permitting a series of assemblies to be mounted onto adjacent teeth. Moreover, the assembly tends to increase dental office efficiency by eliminating the necessity of loading matrix bands into their clamping members prior to the tooth-filling operation. Furthermore, because it is more compact than existing clamping structures, younger patients tend to be less apprehensive of the tooth-filling operation.

While preferred embodiments of the present invention have been described in detail, various modifications, alterations and changes may be made without departing from the spirit and scope of the present invention as defined in the appended claims.

1. A dental matrix band and clamp assembly, comprising: a matrix band having opposite end portions adapted to be folded back upon itself with opposite end portions adjacent one another to form a tooth-engaging loop at mid portion of band, a clamp member having an aperture slidably receiving said end portions of said band, catch means carried by said clamp member including at least one band engaging member located adjacent said aperture and adapted to normally engage the end portions of said band in pressure-applying relation to permit relative displacement of said band end portions in a first direction through said aperture to make said loop smaller and to prevent displacement of said band end portions in the other direction through said aperture, said band engaging member having a sharpened edge inclined in said first direction to permit relative displacement of said band in said first direction through said aperture when said band engaging member is in pressure applying engagement with said band and prevent said relative displacement in said other direction, said band end portions and said clamp member each having tool engaging surfaces formed thereon and confronting one another to permit application of force on said band end portions and clamp to displace said band end portions through said clamp aperture in said first direction, and locking means on said clamp member movable toward and away from a predetermined position, said locking means when moved into said predetermined position urging said catch means and said band into pressure-applying engagement and when moved away from said predetermined position releasing pressure-applying engagement of said catch means and said band to permit displacement of said band end portions through said clamp aperture in said other direction.

2. Apparatus in accordance with claim 1 wherein said catch means consists of a pair of oppositely disposed band engaging member located adjacent opposite sides of said aperture, each of said oppositely disposed members having a sharpened edge inclined in said first direction to permit relative displacement of said band in said first direction through said aperture when said locking means is in said predetermined position and prevent displacement of said band in said other direction through said aperture when said locking means is in said predetermined position.

3. Apparatus in accordance with claim 2 wherein said locking means consists of a member which when in said predetermined position normally urges said catch means toward one another and into pressure-applying engagement with said band.

4. Apparatus in accordance with claim 2 wherein said locking means consists of a member which when in said predetermined position normally urges said band outwardly into pressure-applying engagement with said catch means.

5. Apparatus according to claim 2 wherein said clamp member is bifurcated providing said member with a pair of spaced, generally parallel legs defining said aperture and straddling edgewise said band, said catch means being mounted to said legs and said locking means cooperating with said legs to cause said catch means normally to engage said band, said locking means being mounted for displacement relative to said legs to permit said legs to separate for causing disengagement of said catch means from said band so that said clamping member may be displaced edgewise of said band and disengaged therefrom.

6. Apparatus according to claim 5 wherein said locking means includes a U-shaped spring element straddling said bifurcation and having prongs extending along said legs, detent means in said legs engaged by the prongs of said spring element to bias said legs toward one another and said catch means against said band, and means mounting said spring element for displacement edgewise of said band for permitting separation of said legs upon disengagement of said prongs from said detent means.

7. Apparatus according to claim 6 wherein said spring element mounting means includes a recess in each leg slidably receiving the prongs of said spring member and wherein said detent means includes an upwardly and outwardly concave surface in each recess remote from said bifurcation and engaging mating surfaces adjacent the terminus of each prong.

8. Apparatus according to claim 2 wherein said oppositely disposed members are vertically offset with respect to one another to engage said band at spaced locations.

9. Apparatus according to claim 8 wherein said oppositely disposed members are of material harder than said band and are molded into said clamp member.

* * * * *